United States Patent [19]
Reynolds et al.

[11] Patent Number: 5,753,187
[45] Date of Patent: May 19, 1998

[54] COMBINATORIAL CHEMISTRY CASSETTE

[75] Inventors: Cedric S. Reynolds; Donald A. Boschker, both of Greensboro, N.C.

[73] Assignee: Stovall Life Science, Inc., Greensboro, N.C.

[21] Appl. No.: 663,938

[22] Filed: Jun. 14, 1996

[51] Int. Cl.⁶ .................................................. B01L 3/00
[52] U.S. Cl. .......................... 422/102; 422/99; 422/103; 422/104
[58] Field of Search ........................... 422/99, 102, 103, 422/104

[56] References Cited

U.S. PATENT DOCUMENTS 5,100,626  3/1992  Levin ................................ 422/100
5,141,719  8/1992  Fernwood et al. ................. 422/101
5,219,528  6/1993  Clark ................................ 422/101
5,503,803  4/1996  Brown ............................... 422/102

*Primary Examiner*—Harold Y. Pyon

[57] ABSTRACT

A cassette is provided which includes a combinatorial chemistry dish as used in chemical and biological laboratory work. The cassette includes a metal housing which is adjustable in that it can securely seal a variety of combinatorial dishes having different heights which contain liquid reagents. Planar inner seals placed against the dishes prevent leakage of the reagents while mixing and handling.

8 Claims, 4 Drawing Sheets

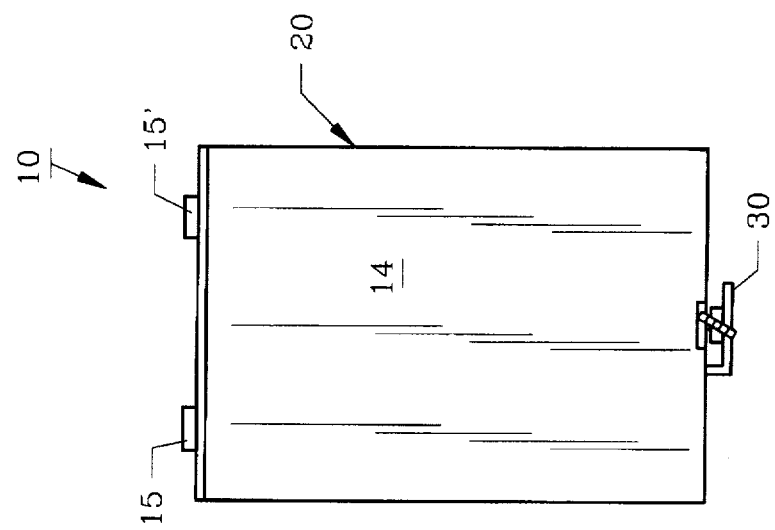
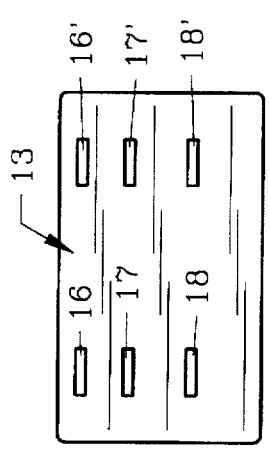
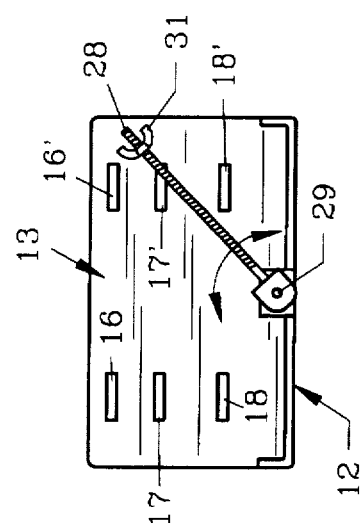

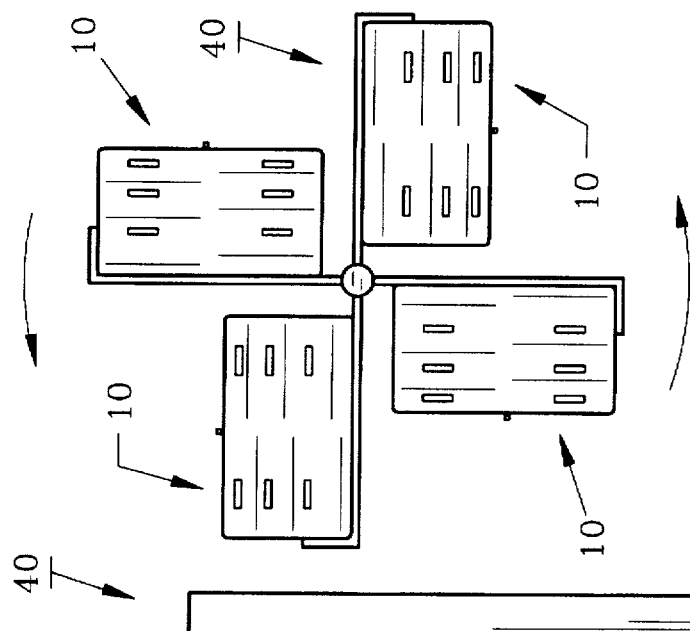
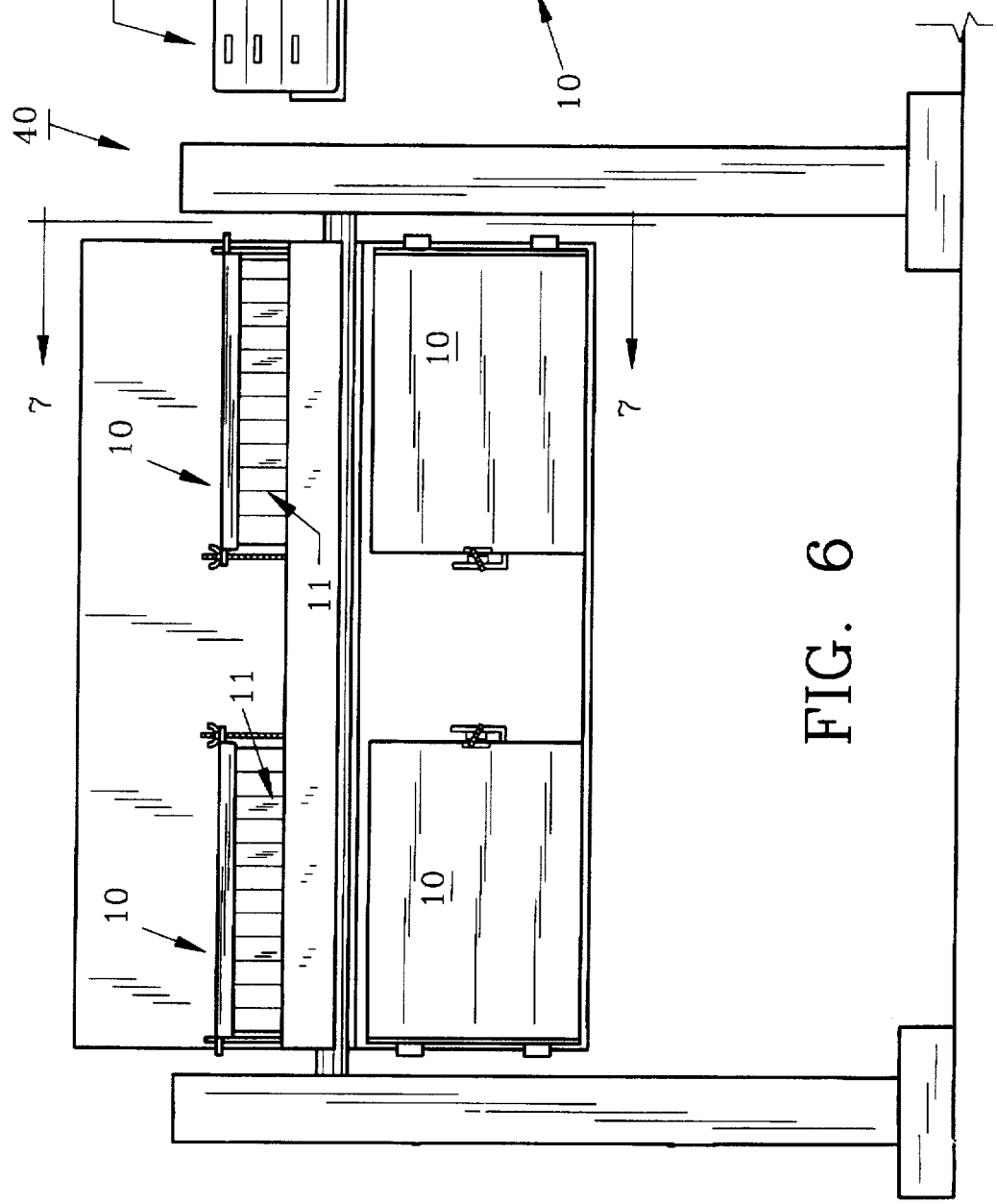

COMBINATORIAL CHEMISTRY CASSETTE

BACKGROUND OF THE INVENTION

1. Field of the Invention

The invention herein pertains to cassettes for use in combinatorial chemical reactions and particularly to cassette housings which are adjustable to accept a wide variety of combinatorial chemical dishes.

2. Description of the Prior Art and Objectives of the Invention

In recent years the pharmaceutical industry has "rediscovered" the use of rapidly combining molecular building blocks through combinatorial chemistry. These techniques allow a modern drug laboratory to produce and screen, for example, a million new chemical and/or biological compounds in a few weeks for a variety of uses. Of the large number of compounds produced, only the ones showing interesting biological activity are analyzed for further testing and experimentation. Non-reactive, plastic combinatorial dishes which have a standard footprint of approximately 86 mm×128 mm are often used having various heights of from approximately 11 mm to approximately 44 mm. Three standard heights are generally in use: 11 mm, 30 mm and 44 mm. While the number of individual reagent cells may vary among different manufacturers of dishes, a 96-cell dish is most frequently available whereby each cell has a diameter of about 5 mm and each can be provided with different reagents. The filled dishes are automatically stirred such as by placing them on a conventional laboratory carousel in a selected environment, as within a temperature-controlled oven. Certain of the conventional combinatorial dishes have openings at both the top and the bottom of the cells while other such dishes are open only along the top. As would be understood, the cells must be fully closed before the mixing operation begins.

Various rigid, and some resilient covers and the like are now used to contain the reagents within the combinatorial dishes for storage. Therefore, there has not been a convenient, simple way to handle a combinatorial dish during mixing or storage and, thus, one of the objectives of the present invention is to provide a cassette housing which will easily accept the various combinatorial dishes for mixing of the fluid reagents.

It is another objective of the present invention to provide a cassette housing which will accept any one of a variety of combinatorial dishes to hold the dishes in a tensioned, leak-proof manner during mixing and storage.

It is still another objective of the present invention to provide a cassette housing which is ruggedly constructed to prevent damage to the combinatorial dish and its contents in the event the cassette is accidentally struck or dropped.

It is a further objective of the present invention to provide a cassette housing which will contain a combinatorial dish which includes a top for adjustment of the height according to which of the various combinatorial dishes is used.

It is yet another objective of the present invention to provide a cassette housing which includes a means to tension the contained combinatorial dish to prevent leakage and spills of the reagents during mixing and handling.

It is also an objective of the present invention to provide a combinatorial cassette which includes a resilient seal for closing the top and/or bottom of the combinatorial dish as needed.

Various other objectives and advantages of the present invention will become apparent to those skilled in the art as a more detailed description is set forth below.

SUMMARY OF THE INVENTION

A cassette for use in combinatorial chemical and biological reactions and assays is provided which includes a metal housing having a base plate with a vertical rear section having a series of pairs of openings therein. The opening pairs allow for the placement of the top at different heights to accommodate various height plates or dishes which have multiple cells for liquid reagent containment. A means to tension the housing top is pivotably affixed to the front of the base plate and in the preferred embodiment, takes the form of a threaded shaft. A wing or knurled nut is manually tightened against a catch positioned along the front of the top whereby pressure can be applied to the dish contained within the housing. In order to prevent spillage of the liquid dish reagents, inert, non-absorbent resilient planar seals are positioned along the top and bottom of the dishes. The cassettes can be placed on carousels or other moving devices to thoroughly mix the reagents, as needed.

BRIEF DESCRIPTION OF THE DRAWINGS

FIG. 3 shows a front view of the cassette housing of FIG. 1 with the top removed;

FIG. 4 depicts a top view of the cassette as shown in FIG. 1 along lines 4—4;

FIG. 5 features a rear view of the cassette as shown in FIG. 1 along lines 5—5;

FIG. 6 schematically demonstrates a typical laboratory carousel without the controls and electrical components attached, and FIG. 7 illustrates a view of the carousel as seen in FIG. 6 along lines 7—7.

DESCRIPTION OF THE PREFERRED EMBODIMENT

Figure 1:
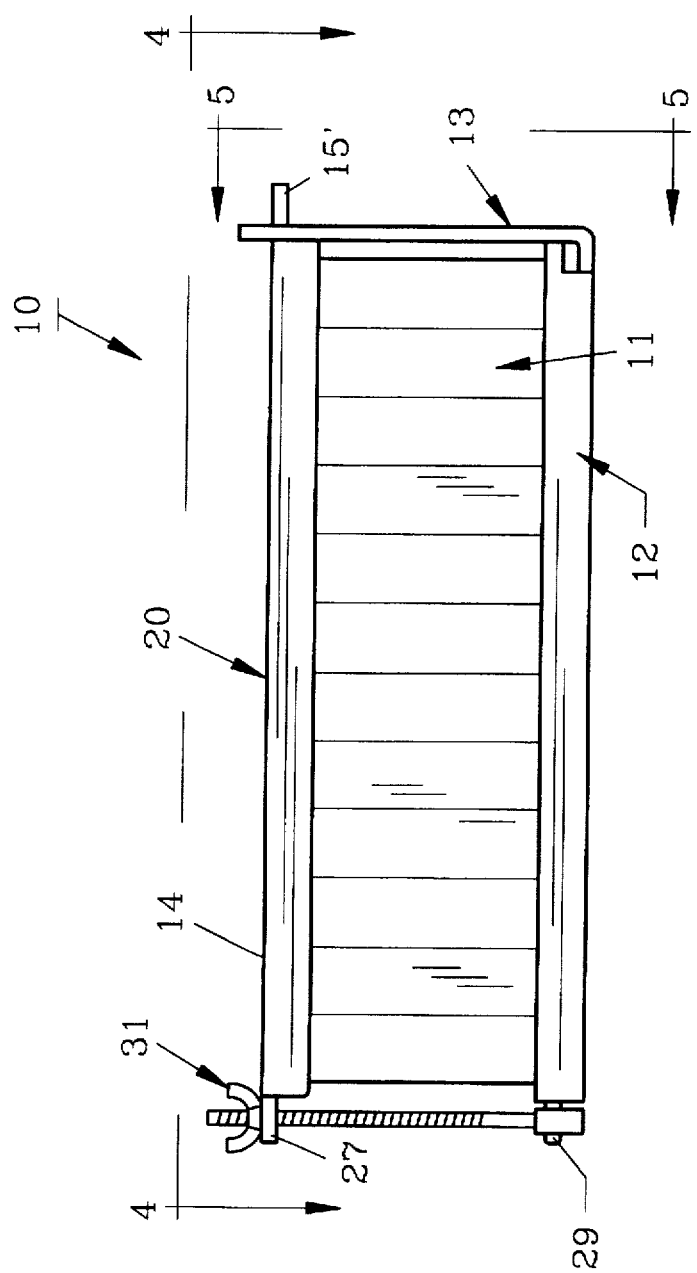
FIG. 1 illustrates a side view of the preferred form of the cassette.
Figure 2:
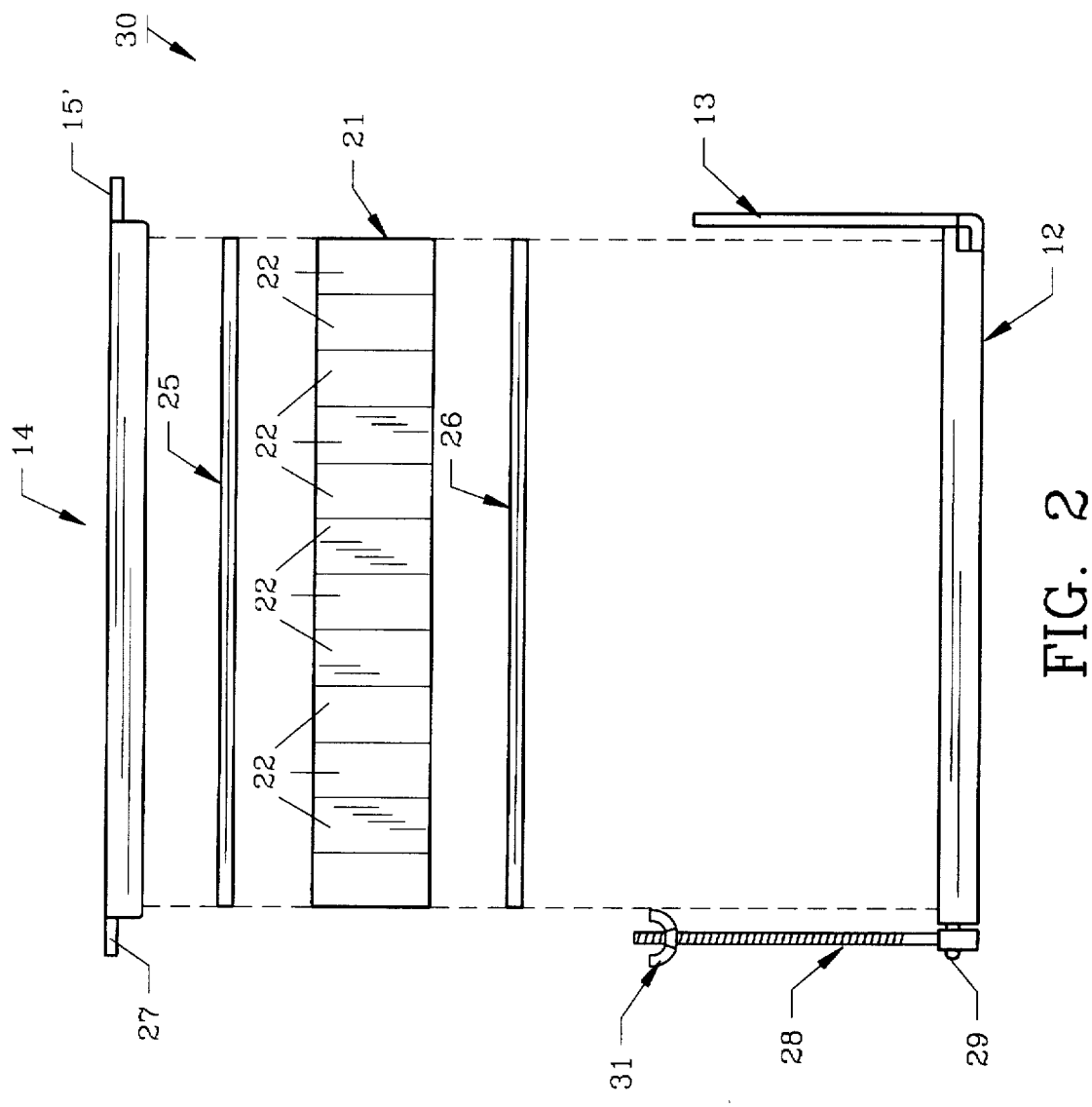
FIG. 2 demonstrates an exploded version of another cassette utilizing a shorter dish.

For a better understanding of the invention and its operation, turning now to the drawings, FIG. 1 illustrates the preferred form of cassette 10 as used in combinatorial chemistry and includes preferred housing 20, and a conventional 96-well dish 11 which can contain approximately 1–5 milliliters of liquid reagent in each well. Other 96-well dishes are also available which have the same footprint of about 86 mm×128 mm but vary in height to accommodate, for example, 800 microliters of reagent or 350 microliters of reagent per well and can be substituted for dish 11 within metal cassette housing 20. Cassette housing 20 includes base plate 12 as shown in FIGS. 2 and 3 with rear section 13 integrally formed therewith as shown in FIGS. 3 and 5. Base plate 12 could be made separate from rear section 13 and attached thereto such as by welding or the like. Top 14 of housing 20, shown in FIG. 2 is formed from a suitable rigid metal, as is base plate 12 and rear section 13.

As pictured in FIG. 4, housing top 14 is substantially rectangularly shaped and includes rear tabs 15, 15' for selective engagement within rear housing section opening pairs 16, 16', 17, 17' or 18, 18' as desired. As would be understood, when using 350 microliter dish 21, (FIG. 2) top tabs 15, 15' are positioned within rear section apertures 18, 18' in order to properly tension dish 21 which contains 350 microliters of reagent per well.

As would be further understood, the reagents contained within cells 22 of dish 21 must be mixed such as by agitation or tumbling and as dish 21 has open top cells 22, seal 25 is positioned in contact with the top of dish 21 between dish 21 and top 14 as also seen in FIG. 2. Seal 25 consists of a non-absorbent resilient polymeric foam material such as a closed cell silicone foam which is inert to the reagents and yet which can be compressed to contain reagents within cells 22 to prevent the reagents escaping while undergoing agitation, tumbling or handling. Also, dish 21 may have openings along the bottom of cells 22 and, therefore seal 26 which may consist of the same inert non-absorbent silicone material is positioned on base 12 for dish 21 to rest thereon.

Once cassette 30 as depicted in FIG. 2 is assembled, in order to prevent spillage, threaded shaft 28 is rotated on axle 29 to an upright, vertical position and is slid into top catch 27 as illustrated in FIG. 4. Next, wing or knurled nut 31 is tightened, (a wing nut being preferred) thereby forcing top 14 downwardly to tension dish 21, compressing seals 25 and 26 to ensure that the contained reagents are secure. Thus, threaded shaft 28 acts as a means to tension top 14 which will pivot to a limited degree from rear section 13 to tightly press dish 21 into seals 25, 26. Various other means for applying tension may be designed to replace the preferred form just described.

In FIG. 6, a standard carousel 40 is shown having cassettes 10 placed thereon which can be secured by bands, straps or the like (not shown). Carousel 40 may be placed in an oven or the like and is electrically operated to rotate for mixing the reagents contained within dishes 11. In FIG. 7, cassette housings 20 safely, conveniently hold dishes 11 during the stirring and mixing process. As would be understood, carousel 40 may be utilized in ambient temperatures or in a heated or cooled environment as required.

Once the mixing (by carousel tumbling) has been completed, cassettes 10 can be removed from the carousel, wing nuts 31 loosened and dishes 11 removed from housing 20 for further processing and/or testing of the reagents.

The illustrations and examples provided herein are for explanatory purposes and are not intended to limit the scope of the appended claims.

We claim:

1. A cassette comprising: a base plate; a top, said top defining a plurality of assembly tabs, said top spaced from said base plate; a combinatorial dish, said combinatorial dish positioned between said top and said base plate; means to apply tension to said dish, said tension application means contiguous to said base plate; and a rear section, said rear section affixed to said base plate, said rear section defining a series of apertures; said tabs selectively positioned within said rear section apertures to thereby selectively adjust the spacing between said top and said base plate while maintaining tension on said dish at each of said selected spacings; and wherein said tension means comprises a threaded member and an axle, said threaded member pivotally mounted by said axle to said base plate.

2. The cassette of claim 1 wherein said top comprises a planar rigid member.

3. The cassette of claim 1 further comprising a catch, said catch attached to said top.

4. The cassette of claim 1 further comprising dish seals, said seals contiguous to said combinatorial dish.

5. A cassette for use in combinatorial chemistry and biological applications comprising: a base plate, a top, said top spaced from said base plate, a combinatorial dish, said dish positioned between said base plate and said top, a first dish seal, said first dish seal contiguous with the top of said combinatorial dish, and means to apply tension to said dish, said tension means attached to said base plate; and a rear section, said rear section affixed to said base plate, said rear section defining a series of apertures; said top defining a plurality of assembly tabs, said tabs selectively positioned within said rear section apertures; and wherein said tension means comprises a threaded member and an axle, said threaded member pivotally mounted by said axle to said base plate.

6. The cassette of claim 5 further comprising a second dish seal, said second dish seal positioned contiguous with the bottom of said combinatorial dish.

7. The cassette of claim 5 wherein said top defines a catch, said threaded member recessed in said catch for securing said combinatorial dish.

8. A cassette housing for holding a combinatorial dish comprising: a base plate, a top, said top spaced from said base plate, said top attached to said base plate for receiving a combinatorial chemistry dish therebetween, means to apply tension to said received combinatorial dish, said tension means attached to said cassette housing, and means to selectively adjust the spacing between said top and said base plate thereby receiving different sized dishes while maintaining tension on said dish at each of said selected spacings, said space adjusting means contiguous to said top; and a rear section, said rear section affixed to said base plate, said rear section defining a series of apertures; said top defining a plurality of assembly tabs, said tabs selectively positioned within said rear section apertures; wherein said tension means comprises a threaded member and an axle, said threaded member pivotally mounted by said axle to said base plate.

* * * * *